(12) United States Patent
Reznik et al.

(10) Patent No.: US 7,430,234 B2
(45) Date of Patent: *Sep. 30, 2008

(54) COMPONENTS AND METHODS FOR PROCESSING IN WIRELESS COMMUNICATION DATA IN PRESENCE OF FORMAT UNCERTAINTY

(75) Inventors: Alexander Reznik, Titusville, NJ (US); Edward L. Hepler, Malvern, PA (US)

(73) Assignee: InterDigital Technology Corporation, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 11/418,861

(22) Filed: May 5, 2006

(65) Prior Publication Data

US 2006/0203893 A1    Sep. 14, 2006

Related U.S. Application Data

(63) Continuation of application No. 10/754,772, filed on Jan. 9, 2004, now Pat. No. 7,065,126.

(60) Provisional application No. 60/450,129, filed on Feb. 25, 2003.

(51) Int. Cl.
  *H04B 1/00*   (2006.01)
(52) U.S. Cl. .................................... 375/147
(58) Field of Classification Search ................ 375/130, 375/145, 147, 149, 142, 143, 150, 152; 455/130, 455/143, 154.1; 370/310, 342, 464, 479
See application file for complete search history.

(56) References Cited

U.S. PATENT DOCUMENTS 6,771,670 B1    8/2004    Pfahler et al.

| | | | |
|---|---|---|---|
| 7,187,708 B1 * | 3/2007 | Shiu et al. .................. 375/148 |
| 2001/0044313 A1 | 11/2001 | Abrishamkar | |
| 2002/0051433 A1 | 5/2002 | Affes et al. | |
| 2002/0077141 A1 | 6/2002 | Hwang et al. | |

(Continued)

FOREIGN PATENT DOCUMENTS

| DE | 100 03 734 | 8/2001 |
|---|---|---|
| JP | 2001 267959 | 9/2001 |
| WO | 99/03225 | 1/1999 |

OTHER PUBLICATIONS

3rd Generation Partnership Project; Technical Specification Group Radio Access Network; Multiplexing and channel coding (FDD) (Release 4); 3GPP TS 25.212 V4.1.0 Jun. 2001.

3rd Generation Partnership Project; Technical Specification Group Radio Access Network; Spreading and modulation (FDD) (Release 4), 3GPP TS 25.213 V4.1.0, Jun. 2001.

(Continued)

*Primary Examiner*—Sam K Ahn
(74) *Attorney, Agent, or Firm*—Volpe and Koenig, PC

(57) ABSTRACT

Components and method are provided to efficiently process wireless communications data where prior knowledge of a specific format of the communication data is not available. A wireless transmit receive unit (WTRU) is configured for use in a wireless communication system where communication data for selected channels is transmitted in system time frames in formats selected from among a set of predefined formats. The WTRU has a receiver, a memory, a received chip rate processor (RCRP) and a format detector. The RCRP is preferably configured to despread each wireless signal of spread data received in each time frame using a minimum spreading code or other appropriate key sequence and to store resultant despread data for each respective time frame in the memory. The format detector is preferably configured to determine the number of physical channels and the respective spreading factor for each physical channel for the wireless signal of spread data.

20 Claims, 3 Drawing Sheets

U.S. PATENT DOCUMENTS

2002/0115464 A1 8/2002 Hwang et al.
2003/0198210 A1 10/2003 Haim
2004/0153679 A1 8/2004 Fitton et al.
2005/0018614 A1* 1/2005 Kiran .......................... 370/252
2005/0083998 A1* 4/2005 Li et al. ...................... 375/148

OTHER PUBLICATIONS

3rd Generation Partnership Project; Technical Specification Group Radio Access Network; Channel coding and multiplexing examples (Release 4), 3GPP TR 25.944 V4.1.0, Jun. 2001.

* cited by examiner

COMPONENTS AND METHODS FOR PROCESSING IN WIRELESS COMMUNICATION DATA IN PRESENCE OF FORMAT UNCERTAINTY

CROSS REFERENCE TO RELATED APPLICATION(S)

This application is a continuation of U.S. patent application Ser. No. 10/754,772, now U.S. Pat. No. 7,065,126, filed Jan. 9, 2004 which in turn claims priority from U.S. Provisional Application No. 60/450,129 filed on Feb. 25, 2003, which are both incorporated by reference herein as if fully set forth.

FIELD OF THE INVENTION

This invention generally relates to data processing of wireless communications and more particularly to data processing of the physical channel wireless signals when there is uncertainty of the data format.

BACKGROUND OF THE INVENTION

Wireless telecommunication systems are well known in the art. In order to provide global connectivity for wireless systems, standards have been developed and are being implemented. One current standard in widespread use is known as Global System for Mobile Telecommunications (GSM). This is considered as a so-called Second Generation mobile radio system standard (2G) and was followed by its revision (2.5G). GPRS and EDGE are examples of 2.5G technologies that offer relatively high speed data service on top of (2G) GSM networks. Each one of these standards sought to improve upon the prior standard with additional features and enhancements. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

A typical UMTS system architecture in accordance with current 3GPP specifications is depicted in FIG. 1. The UMTS network architecture includes a Core Network (CN) interconnected with a UMTS Terrestrial Radio Access Network (UTRAN) via an interface known as Iu which is defined in detail in the current publicly available 3GPP specification documents. The UTRAN is configured to provide wireless telecommunication services to users through wireless transmit receive units (WTRUs), known as User Equipments (UEs) in 3GPP, via a radio interface known as Uu. The UTRAN has one or more Radio Network Controllers (RNCs) and base stations, known as Node Bs in 3GPP, which collectively provide for the geographic coverage for wireless communications with UEs. One or more Node Bs is connected to each RNC via an interface known as Iub in 3GPP. The UTRAN may have several groups of Node Bs connected to different RNCs; two are shown in the example depicted in FIG. 1. Where more than one RNC is provided in a UTRAN, inter-RNC communication is performed via an Iur interface.

Communications external to the network components are performed by the Node Bs on a user level via the Uu interface and the CN on a network level via various CN connections to external systems.

In general, the primary function of base stations, such as Node Bs, is to provide a radio connection between the base stations' network and the WTRUs. Typically a base station emits common channel signals allowing non-connected WTRUs to become synchronized with the base station's timing. In 3GPP, a Node B performs the physical radio connection with the UEs. The Node B receives signals over the Iub interface from the RNC that controls the radio signals transmitted by the Node B over the Uu interface.

A CN is responsible for routing information to its correct destination. For example, the CN may route voice traffic from a UE that is received by the UMTS via one of the Node Bs to a public switched telephone network (PSTN) or packet data destined for the Internet. In 3GPP, the CN has six major components: 1) a serving General Packet Radio Service (GPRS) support node; 2) a gateway GPRS support node; 3) a border gateway; 4) a visitor location register; 5) a mobile services switching center; and 6) a gateway mobile services switching center. The serving GPRS support node provides access to packet switched domains, such as the Internet. The gateway GPRS support node is a gateway node for connections to other networks. All data traffic going to other operator's networks or the internet goes through the gateway GPRS support node. The border gateway acts as a firewall to prevent attacks by intruders outside the network on subscribers within the network realm. The visitor location register is a current serving networks 'copy' of subscriber data needed to provide services. This information initially comes from a database which administers mobile subscribers. The mobile services switching center is in charge of 'circuit switched' connections from UMTS terminals to the network. The gateway mobile services switching center implements routing functions required based on current location of subscribers and also receives and administers connection requests from subscribers from external networks.

The RNCs generally control internal functions of the UTRAN. The RNCs also provide intermediary services for communications having a local component via a Uu interface connection with a Node B and an external service component via a connection between the CN and an external system, for example overseas calls made from a cell phone in a domestic UMTS. Typically an RNC oversees multiple base stations, manages radio resources within the geographic area of wireless radio service coverage serviced by the Node Bs and controls the physical radio resources for the Uu interface. In 3GPP, the Iu interface of an RNC provides two connections to the CN: one to a packet switched domain and the other to a circuit switched domain. Other important functions of the RNCs include confidentiality and integrity protection.

The Uu radio interface of a 3GPP communications system uses Transport Channels (TrCH) for transfer of user data and signaling between UEs and Node Bs. In 3GPP communications, TrCH data is conveyed by one or more physical channels defined by mutually exclusive physical resources. TrCH data is transferred in sequential groups of Transport Blocks (TB) defined as Transport Block Sets (TBS). Each TBS is transmitted in a given Transmission Time Interval (TTI) which may span a plurality of consecutive system time frames. A typical system time frame is 10 milliseconds and TTIs are currently specified as spanning 1, 2, 4 or 8 of such time frames. U.S. patent application Ser. No. 10/417,586 entitled RECEIVING STATION FOR CDMA WIRELESS SYSTEM AND METHOD published as Publication No. US-2003-0198210-A1 on Oct. 23, 2003, owned by the assignee of the present invention describes the details of a receiver for such signals.

FIG. 2 illustrates the processing in preparation for transmission of uplink TrCHs in Frequency Division Duplex (FDD) mode into a Coded Composite TrCH (CCTrCH) and then into one or more physical channel data streams in accordance with 3GPP TS 25.212 v4.1.0. Starting with the TB of data, Cyclic Redundancy Check (CRC) bits are attached. TB concatenation and code block segmentation is then performed. Channel coding in the form of convolution coding or turbo coding is then performed, but in some instances no coding is specified. The steps after coding include radio frame equalization, a first interleaving, radio frame segmentation and rate matching. The radio frame segmentation divides the data over the number of frames in the specified TTI. The rate matching function operates by means of bit repetition or puncturing and defines the number of bits for each processed TrCH which are thereafter multiplexed to form a CCTrCH data stream.

The processing of the CCTrCH data stream includes physical channel segmentation when more than one physical channel is to be used, a second interleaving and mapping onto the one or more physical channels being used for the TTI per the TFC. The number of physical channels corresponds to the physical channel segmentation. Each physical channel data stream is then spread with a format-defined channelization code and spreading factor and modulated for over air transmission on an assigned frequency.

In FDD uplink, the number of physical channels and the respective spreading parameters per CCTrCH are dynamic link parameters which are chosen by the rate matching algorithm on a TTI-by-TTI basis based on the instantaneous amount of data that is to be transmitted. The range of values which these two parameters can take on is limited by the allowed transport format combinations (TFCs) which are negotiated during link setup. The set of allowed combinations is referred to as the Transport Format Combination Set (TFCS). The TFC selected for a given CCTrCH defines the number of PhCHs to be used and the respective spreading code and spreading factor for each PhCH. This information can be transmitted via a transport format combination indicator (TFCI) in the same frame as the data formatted according to the TFC. However, 3GPP specifications allow for the transmission of a TFCI to be omitted. Where a TFCI is transmitted, the TFCI data bits are selectively added to the CCTrCH data being mapped to each physical channel after the second interleaving. Examples of TrCH formatting for a 3GPP system are provided in TR 25.944 V4.1.0.

In the reception/decoding of the TrCH data, the processing is essentially reversed by the receiving station. Accordingly, UE and Node B physical reception of TrCHs require knowledge of TrCH processing parameters to reconstruct the TBS data. Receiving station processing is facilitated by the transmission of the TFCI for a CCTrCH. 3GPP provides for "blind transport format detection" (BTFD) by the receiving station, such as where the TFCI is not transmitted, in which case the receiving station considers the potential valid TFCIs for the particular type of channel being received. Where there is only one valid TFCI, that TFCI is used in either case.

In the case of UMTS W-CDMA uplink transmissions, signals are received from multiple UEs by a Node B base station in a plurality of physical channels. The data in each physical channel is received in spread form and must be de-spread. The physical channel (PhCH) portion of the receiver performs the de-spreading where each PhCH is despread using a received chip rate processor (RCRP) based upon the spreading code used by the transmitter for the particular channel. After despreading data channel processing typically begins with the second de-interleaving stage where the data from each physical channel is de-interleaved independently.

Despreading and independent second de-interleaving each PhCH are accomplished without delay for systems where the number of PhCH is know as well as the respective spreading factor and spreading code for each PhCH. However, in wireless communications such as 3GPP FDD uplink, the number of physical channels per CCTrCH and respective spreading factors and spreading codes are dynamic parameters, and their exact values for a frame are carried within that same frame either implicitly or explicitly through the inclusion of a TFCI.

In data processing for the physical channel carrying a CCTrCH, the unavailability of information regarding the transport format is problematic. In order to use existing methods of data processing communication data in 3GPP systems, unspread data in the form of chip samples for each frame can be buffered in a memory creating a one time frame period delay. The spreading factors, codes and the number of physical channels are then determined by either evaluating a transmitted TFCI within the buffered frame or through BTFD adding a small time fraction. The buffered chip samples for the frame are then despread using an RCRP based upon the determined spreading factors, spreading codes and the number of physical channels to produce data for each physical channel for second de-interleaving.

In order to conduct the de-interleaving processing, the de-interleaver requires the entire despread frame of data. Thus a second one time frame period delay is required before de-interleaving can commence. Not only does this processing include the substantial processing delay of two time frame periods, but the buffering of entire frames of chip samples requires substantial amounts of memory, particularly where sampling is done at twice the chip rate and the received signal is processed in both in-phase and quadrature components as is typical with 3GPP systems.

It is desirable to provide a receiver capable of efficient data processing of a composite channel when knowledge of the transport format is not available. In particular, it would be highly beneficial to avoid the buffering of entire frames of chip samples and the inherent two time frame delay in processing such signals.

SUMMARY OF THE INVENTION

The present invention provides components and methods for time and resource efficient data processing of received wireless communication signals where prior knowledge of the specific format of the communication data is not available.

The invention can be implemented in a wireless transmit receive unit (WTRU) configured for use in a wireless communication system where communication data for selected channels is transmitted in system time frames in formats selected from among a set of predefined formats. The communication data for each frame is prepared for transmission in a format selected for that time frame by segmentation into a format-defined number of physical channels, followed by interleaving of the data for each physical channel, followed by spreading the interleaved data for each physical channel using a respective format-defined spreading code and a respective format-defined spreading factor such that the respective spread data for all physical channels specified by the selected format for the time frame is transmitted as a wireless signal in the time frame. In some such systems, there exists a key sequence such as a minimum spreading code defined for a physical channel of one of the formats of the set of predefined formats which is a subset of the spreading codes defined for all of the physical channels of all other formats of the set of predefined formats.

The WTRU has a receiver, a memory, a received chip rate processor (RCRP), a format detector and a de-interleaver. The receiver is configured to receive sequential frames of wireless signals of spread data. The RCRP is preferably configured to despread each wireless signal of spread data received in each time frame using the minimum spreading code or other appropriate key sequence and to store resultant despread data for each respective time frame in the memory. The format detector is preferably configured to determine the number of physical channels and the respective spreading factor for each physical channel for the wireless signal of spread data received in each time frame based upon processing the received signal for each respective time frame. The de-interleaver is preferably configured to de-interleave the stored data despread by the RCRP for each respective time frame into the determined number of physical channels based upon the number of physical channels and respective spreading factor for each physical channel determined by the format detector for the respective time frame.

Preferably, the WTRU is configured as a Node B to receive frequency division duplex (FDD) uplink communication signals and there exists at least two format-defined spreading codes of different lengths defined within the set of predefined formats and all format-defined spreading codes of the set of predefined formats consist of one or more repetitions of a minimum spreading code or are the same length as the minimum spreading code. In particular, the RCRP is preferably configured to despread multiple types of CCTrCHs, each having a predefined TFCS of TFCs using a respective selected TFC having a highest data rate, for the type of CCTrCH of respective received frames and the format detector is configured to determine the actual TFC used in formatting the data for the respective frame. Where a TFCI is transmitted within each frame of data reflecting the TFC for that frame of transmitted data, the format detector preferably detects the TFCI of each frame of data. Alternatively, the format detector implements blind code format detection.

An application specific integrated circuit (ASIC) can be configured with the memory, RCRP, format detector and de-interleaver components.

A method of wireless communication is provided where communication data for selected channels is transmitted in system time frames in formats selected from among a set of predefined formats. The method includes receiving sequential frames of wireless signals of spread data. Each wireless signal of spread data received in each time frame is despread using a minimum spreading code or other appropriate key sequence. The resultant despread data for each respective time frame is stored in a memory. The number of physical channels and the respective spreading factor for each physical channel for the wireless signal of spread data received in each time frame is determined based upon processing the received signal for each respective time frame. The stored data despread by the RCRP for each respective time frame into the determined number of physical channels is de-interleaved based upon the number of physical channels and respective spreading factor for each physical channel determined for the respective time frame. Where the received signals are frequency division duplex (FDD) uplink communication signals of and there exists at least two format-defined spreading codes of different lengths defined within the set of predefined formats and all format-defined spreading codes of the set of predefined formats consist of one or more repetitions of a minimum spreading code or are the same length as the minimum spreading code, the minimum spreading code is used for despreading. Where multiple types of CCTrCHs, each having a predefined TFCS of TFCs are despread using a respective selected TFC having a highest data rate, for the type of CCTrCH of respective received frames, the actual TFC used in formatting the data for the respective frame is preferably detected to determine the number of physical channels and the respective spreading factor for each physical channel for the wireless signal of spread data received in each time frame. Where a TFCI is transmitted within each frame of data reflecting the TFC for that frame of transmitted data, the format is preferably determined by detecting the TFCI of each frame of data. Alternatively, the actual TFC for each frame is detected using blind code format detection.

Other objects and advantages will be apparent to those skilled in the art from the following detailed description.

DETAILED DESCRIPTION OF PREFERRED EMBODIMENTS

Figure 1:
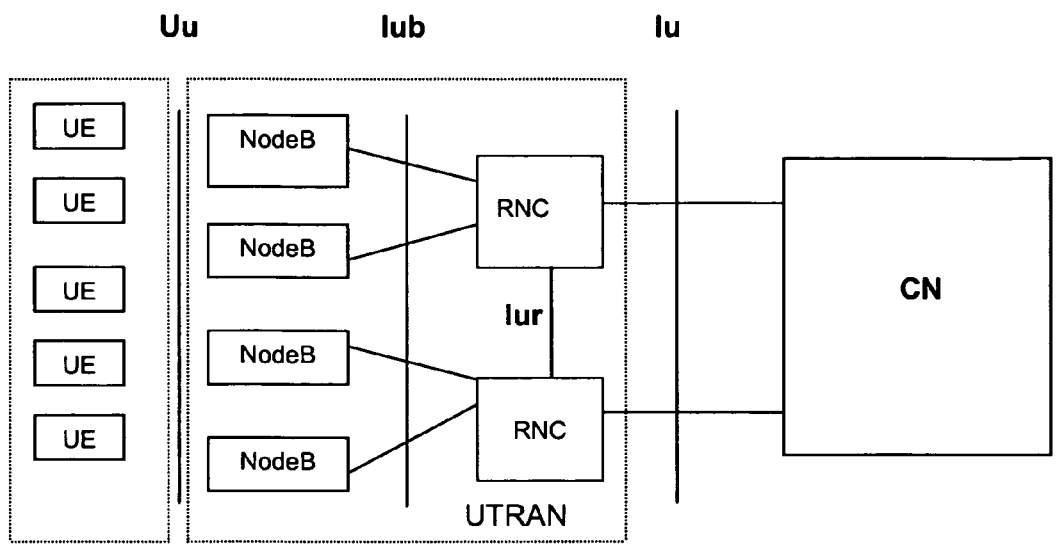
FIG. 1 is a schematic diagram of a typical CDMA system in accordance with current 3GPP specifications.

The present invention is described with reference to the drawing figures wherein like numerals represent like elements throughout. The terms base station, wireless transmit/receive unit (WTRU) and mobile unit are used in their general sense. The term base station as used herein includes, but is not limited to, a base station, Node-B, site controller, access point, or other interfacing device in a wireless environment that provides WTRUs with wireless access to a network with which the base station is associated.

The term WTRU as used herein includes, but is not limited to, a base station, user equipment (UE), mobile station, fixed or mobile subscriber unit, pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

Although the embodiments are described in conjunction with a third generation partnership program (3GPP) wideband code division multiple access (W-CDMA) system utilizing the frequency division duplex (FDD) mode, the invention is applicable to any wireless communication system where communication data for selected channels is transmitted in system time frames in formats selected from among a set of predefined formats wherein communication data for each frame is prepared for transmission in a format selected for that time frame by segmentation into a format-defined number of physical channels, followed by interleaving of the data for each physical channel, followed by spreading the interleaved data for each physical channel using a respective format-defined spreading code and a respective format-defined spreading factor such that the respective spread data for all physical channels specified by the selected format for the time frame is transmitted as a wireless signal in the time frame, where there is a relationship between format-defined spreading codes that can be exploited to despread received wireless signals in a selected manner irrespective of the actual format of the set of predefined formats that was used for transmission.

In analyzing the problem of processing received data signals where incomplete format information is known, the inventors recognized that partial knowledge relating to the signal format could be advantageously exploited. In particular, for wireless communications, such as 3GPP FDD uplink, the inventors recognized that a predefined relationship of the defined spreading codes can form a basis for a system of time and resource efficient processing of the received data signals. The inventors recognized that a key sequence could be used for dispreading irrespective of the particular format in some format sets.

In 3GPP FDD uplink communications, when multiple data PhCHs are used by a UE, they are all constrained to have spreading factor 4 and the spreading codes used are predetermined according to an index of the PhCH. The codes are defined in 3GPP TS 25.213 v4.1.0 par. 4.3.1.2 and, in particular DPDCH1 is assigned the spreading code $\{+1, +1, -1, -1\}$. When no multi-code is used, the spreading code for the physical data channel (PhCH) is defined to consist of a number of periodic repetitions of the bit pattern $\{+1, +1, -1, -1\}$, where the number of these repetitions is equal to the spreading factor divided by 4. Thus, if no multi-code is used in the 3GPP FDD uplink, the spreading code is essentially equivalent to the minimum spreading code used for spreading factor 4, no matter what the actual spreading factor is used.

Due to the relationship of the spreading codes, the inventors recognized that a TFC with the highest data rate can be selected and advantageously used for RCRP processing the received spread signals, even if a the signals were actually formatted in accordance with a different TFC of the TFCS. For each TFCS there is always at least one TFC having a data rate which is as high as or higher than the data rates for all of the other TFCs for the TFCS. In 3GPP FDD uplink, if a TFC defines multiple PhCHs that TFC will have such a data rate, and is selected as the TFC with the highest data rate. Otherwise such a TFC that defines a single PhCH channel is selected as the TFC with the highest data rate. As a result, the RCRP processing of the wireless spread signal for each time frame will include processing of at least a portion of the frame with the minimum spreading code which results in despread data that can be selectively de-interleaved to reproduce the transmitted data as it constituted before the second interleaving process in advance of transmission.

Figure 3:
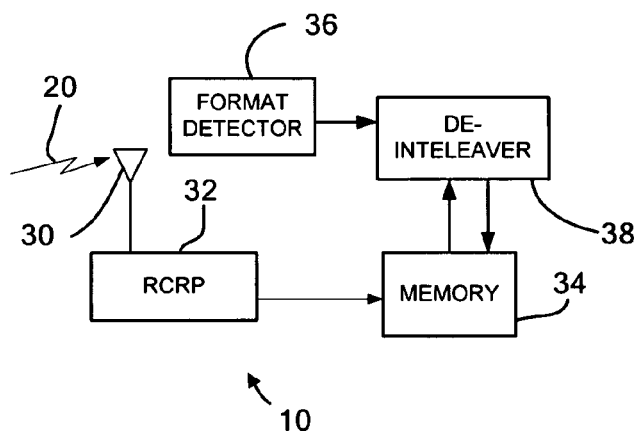
FIG. 3 is a block diagram of a receiving portion of a communication station made in accordance with the teachings of the present invention.

With reference to FIG. 3, components of a WTRU 10 are illustrated in accordance with the teachings of the present invention. In a preferred embodiment, the WTRU 10 is configured as a Node B for a 3GPP system that receives communication signals 20 in FDD mode from one or more UEs. The WTRU includes an antenna system 30 that receives sequential time frames of selectively formatted wireless signals 20. A physical channel processing receiving component 32, that includes a received chip rate processor (RCRP), is provided to process the wireless signals 20 received via the antenna system 20.

The WTRU 10 is designed for use where communication data for selected channels is transmitted in system time frames in formats selected from among a set of predefined formats wherein communication data for each frame is prepared for transmission in a format selected for that time frame by segmentation into a format-defined number of physical channels, followed by interleaving of the data for each physical channel, followed by spreading the interleaved data for each physical channel using a respective format-defined spreading code and a respective format-defined spreading factor such that the respective spread data for all physical channels specified by the selected format for the time frame is transmitted as a wireless signal in the time frame and partial knowledge of the formatting of the wireless signals is known through the initiation of the communication with the WTRU 10. In particular, the RCRP is configured to exploit a relationship between format-defined spreading codes to despread the received wireless signals for each time frame in a selected manner irrespective of the actual format of the set of predefined formats that was used for transmission. The selectively processed despread signal data is stored in a memory 34 as it is generated by the RCRP of the physical channel processing receiving component 32.

A format detector 36 is provided to determine the actual format used in preparing the data for the particular time frame for transmission, either through the processing of format identification data, such as a TFCI in a 3GPP system, which is transmitted in the time frame or by blind format detection based upon the characteristics of the received data signal for the time frame which can be based upon the despread data generated by the RCRP.

Figure 2:
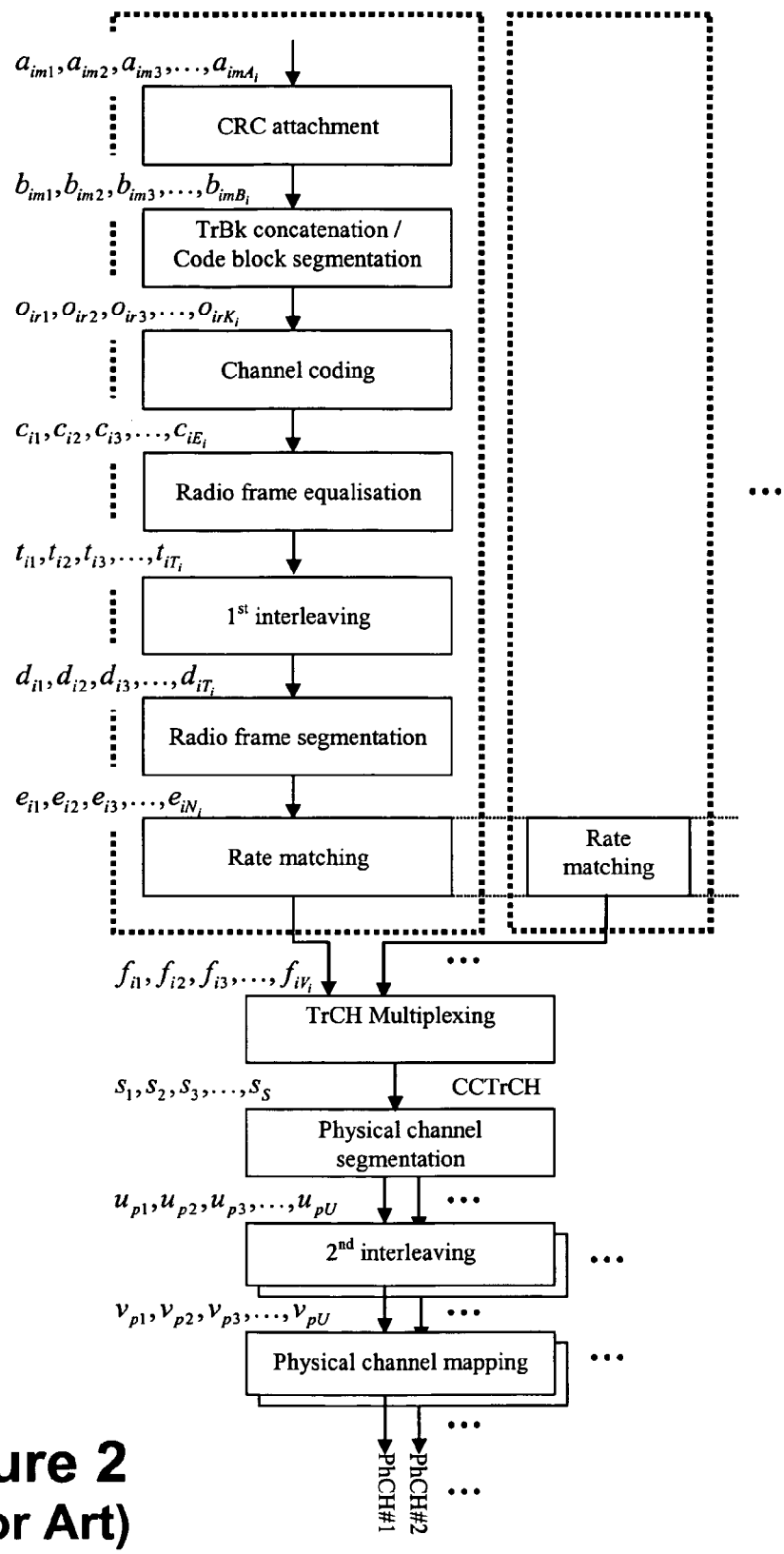
FIG. 2 is a processing diagram of TrCH data for a CCTrCH in accordance with 3GPP FDD specifications.

A de-inteleaver 38 is provided to de-interleave the despread data generated by the RCRP. As with conventional receivers, the de-interleaver 38 must wait until an entire time frame is despread, before it can commence the de-interleaving process. However, unlike conventional receivers where the specific data format is known or where a format detector provides information of the number of physical channels and respective spreading codes and spreading factors upon which the RCRP relies to selectively despread the received signals, the format detector 36 is associated with the de-interleaver 38 to provide information of the number of physical channels and respective spreading codes and spreading factors upon which the de-interleaver 38 relies to selectively de-interleave each frame of despread data stored in the memory. The result of the selective despreading is a reproduction of the data for each actual format-specified PhCH prior to interleaving for transmission. In the context of a WTRU 10 configured to receive 3GPP FDD uplink signals, the de-interleaving functions as an inverse of the conventional second interleaving step represented in FIG. 2.

Preferably, the de-interleaver 38 is of a block type whose depth is dynamically adjusted so that it is equal to exactly one frame for every physical channel, no matter how much raw data is actually transmitted on that channel in any given frame. The de-interleaver has of an address generation unit which reads the data for a physical channel from memory 34 once the whole frame is available and writes the re-arranged data to a new memory location, preferably in the memory 34.

The memory 34 preferably includes a 2nd de-interleaver input data block 21 and a 2nd de-interleaver output data block 22, which are used by the address generator 15. The 2nd de-interleaver input data block 21 is used to hold input data to be provided to the address generator 15, and the 2nd de-interleaver output data block 22 accepts output data from the address generator 15

Preferably, the RCRP 32 is configured to despread the received signals 20 of each time frame according to the worst (highest data) allowed format from among the set formats defined for the type of data channel being received. For 3GPP FDD uplink communications several types of CCTrCHs can be used, each with its own TFCS. A TFC with a highest data rate is selected as described above with respect to each TFCS.

The RCRP 34 then processes the received signals 20 of a specific type of CCTrCH as if the selected TFC of the respective TFCS was the actual configuration and writes the output to the shared memory 34. The spreading code of the selected TFC is known precisely, so the only possible "error" for the 3GPP FDD example is in the spreading factor, which may be too low, and the number of DPDCHs, which may be excessive.

Before the de-interleaver 38 commences its operation, the format decoder 36 decodes a transmitted TFCI or uses blind code detection to determine the actual TFC used in preparing the data for transmission. The CCTrCH de-interleaving for the 3GPP FDD uplink example then proceeds according to one of the following four possibilities:

1. The CCTrCH is actually configured according to the worst TFC, the data is simply de-interleaved in a conventional manner since the RCRP will have been processed in the same manner had the RCRP known the TFC in advance of despreading.
2. The worst configuration has only one physical channel, but at a spreading factor higher than the actual spreading factor used. In this case, due to the defined relationship of the spreading codes, the spreading code for the high actual spreading factor will be an even repetition of the minimum spreading code used by the RCRP for despreading the data. Accordingly, an integrate-and-dump operation is completed before de-interleaving by summing (averaging) every k adjacent RCRP output data elements, where $$k = SF_{actual} / SF_{min}$$

is the ratio between the actual and the worst case spreading factors. Thus, for example, if the worst case TFC calls for a spreading factor of 4 and the actual spreading factor used is 8, then each pair of outputs for the given frame is added before the de-interleaving operation.

3. The worst-case configuration has more physical channels and the actual configuration uses only one channel at a spreading factor 4. In this case, due to the defined relationship of the spreading codes, the spreading code for the actual TFC will be the same as the minimum spreading code used by the RCRP for despreading the data. In this case, the data that was despread by the RCRP using other spreading codes for the PhCHs of the worst case TFC that do not use the minimum spreading code are discarded.
4. The worst-case configuration has several physical channels and the actual configuration uses only one channel at a spreading factor higher than 4. The data for the existing physical channel is further added to implement the necessary spreading factor, as described above in 2 (with $SF_{min} = 4$).

Preferably, the combination of the worst possible TFC for each CCTrCH is not allowed to exceed the total system capacity limit. The total capacity limit results in the total shared memory required at the interface between the RCRP 32 and de-interleaver 38 being equivalent to conventional receivers.

A critical aspect of the de-interleaving process is the timing of the operations, which is generally illustrated in FIG. 3. A frame of data (numbered x), can be defined as beginning arriving from the received chip rate processor (RCRP) at time t. Thus t is the time when the RCRP completes processing the first bit of the frame. The RCRP completes writing the data for frame x at time (t+1 frame). At this point it begins writing data for frame x+1 to a different location in the memory. Once the data for frame x is in the memory, the CCTrCH processing, in particular the address generator for the 2nd de-interleaver, are configured and begin processing this data at time (t+1 frame+ $\Delta$CCTrCH) where $\Delta$CCTrCH is an implementation-dependent delay.

Preferably, the components that implement the data processing illustrated in FIG. 3 are implemented on an single integrated circuit, such as an application specific integrated circuit (ASIC). However, portions of the processing may also be readily implemented on multiple separate integrated circuits.

Figure 4:
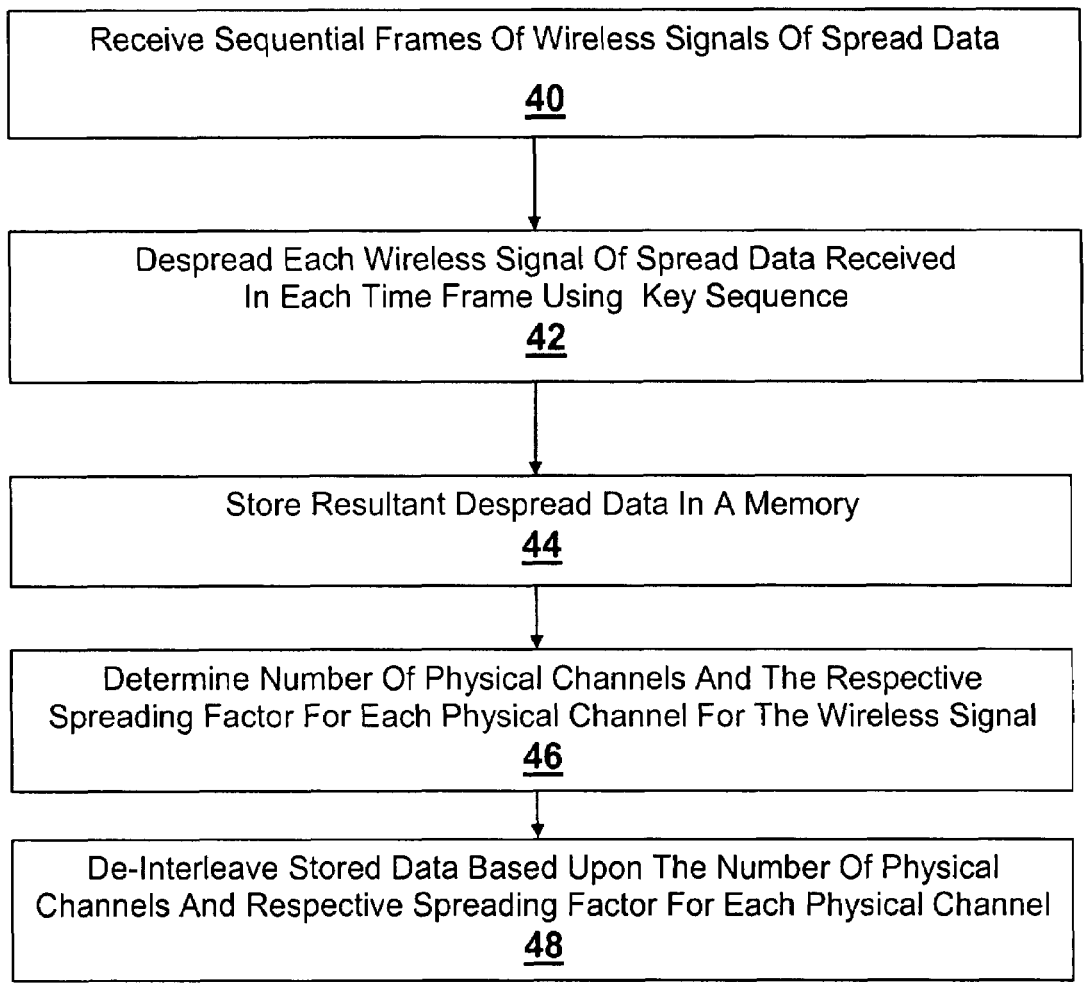
FIG. 4 is a flow of a receiving method in accordance with the teachings of the present invention.

Refering to FIG. 4, a preferred method of wireless communication is illustrated where communication data for selected channels is transmitted in system time frames in formats selected from among a set of predefined formats. The method includes receiving sequential frames of wireless signals of spread data Step 40. Each wireless signal of spread data received in each time frame is despread using a minimum spreading code or other appropriate key sequence Step 42. The resultant despread data for each respective time frame is stored in a memory Step 44. The number of physical channels and the respective spreading factor for each physical channel for the wireless signal of spread data received in each time frame is determined based upon processing the received signal for each respective time frame Step 46. The stored data despread by the RCRP for each respective time frame into the determined number of physical channels is de-interleaved based upon the number of physical channels and respective spreading factor for each physical channel determined for the respective time frame Step 48. Where the received signals are frequency division duplex (FDD) uplink communication signals of and there exists at least two format-defined spreading codes of different lengths defined within the set of predefined formats and all format-defined spreading codes of the set of predefined formats consist of one or more repetitions of a minimum spreading code or are the same length as the minimum spreading code, the minimum spreading cod is used for despreading. Where multiple types of CCTrCHs, each having a predefined TFCS of TFCs are despread using a respective selected TFC having a highest data rate, for the type of CCTrCH of respective received frames, the actual TFC used in formatting the data for the respective frame is preferably detected to determine the number of physical channels and the respective spreading factor for each physical channel for the wireless signal of spread data received in each time frame. Where a TFCI is transmitted within each frame of data reflecting the TFC for that frame of transmitted data, the format is preferably determined by detecting the TFCI of each frame of data. Alternatively, the actual TFC for each frame is detected using blind code format detection.

The invention is described hereinabove in a preferred embodiment as being applicable to 3GPP FDD uplink communications, only as an example, but is equally applicable to other spread spectrum scenarios without departing from the scope of the invention as described hereinabove.

What is claimed is:

1. A wireless transmit receive unit (WTRU) for use in a wireless communication system comprising:
   a receiver configured to receive sequential time frame of wireless signals of spread communication data for selected channels in formats selected from among a set of predefined formats wherein communication data for each time frame is received in a format-defined number of physical channels in which the data for each physical channel has been spread using a respective format-defined spreading code and a respective format-defined spreading factor and where at least two different spreading codes are defined for use within the set of predefined formats;

a memory;

a received chip rate processor (RCRP) configured to despread each wireless signal of spread data received in each time frame using a key sequence which is usable to despread the spreading codes defined for all of the physical channels of all formats of the set of predefined formats and configured to store resultant despread data for each respective time frame in the memory; and a format detector configured to determine the number of physical channels and the respective spreading factor for each physical channel for the wireless signal of the spread data received in each time frame based upon processing the received signal for each respective time frame.

2. A WTRU according to claim 1 wherein the receiver is configured to receive sequential time frames of wireless signals of interleaved spread communication data, further comprising:

a de-interleaver configured to de-interleave the stored data despread by the RCRP for each respective time frame into the determined number of physical channels based upon the number of physical channels and respective spreading factor for each physical channel determined by the format detector for the respective time frame.

3. A WTRU according to claim 1 where the key sequence which usable to despread the spreading codes defined for all of the physical channels of all formats of the set of predefined formats is a minimum spreading code defined for a physical channel of one of the formats of the set of predefined formats which is a subset of the spreading codes defined for all of the physical channels of all other formats of the set of predefined formats, wherein the RCRP is configured to despread each wireless signal of spread data received in each time frame using the minimum spreading code.

4. A WTRU according to claim 3 where the WTRU is configured as a Node B to receive frequency division duplex (FDD) uplink communication signals of and there exists at least two format-defined spreading codes of different lengths defined within the set of predefined formats and all format-defined spreading codes of the set of predefined formats consist of one or more repetitions of a minimum spreading code or are the same length as the minimum spreading code.

5. A WTRU according to claim 1 wherein the RCRP is configured to despread multiple types of Coded Composite Transport Channels (CCTrCHs), each having a predefined Transport Format Combination Set (TFCS) of Transport Format Combinations (TFCs) using a respective selected TFC having a highest data rate, for the type of CCTrCH of respective received frames and the format detector is configured to determine the actual TFC used in formatting the data for the respective frame.

6. A WTRU according to claim 5 where a Transport Format Combination Indicator (TFCI) is received within each frame of data reflecting the TFC for that frame of data wherein the format detector detects the TFCI of each frame of data.

7. A WTRU according to claim 5 wherein the format detector implements blind code format detection.

8. A method of wireless communication comprising:

receiving sequential time frame of wireless signals of spread communication data for selected channels in formats selected from among a set of predefined formats wherein communication data for each time frame is received in a format-defined number of physical channels in which the data for each physical channel has been spread using a respective format-defined spreading code and a respective format-defined spreading factor and where at least two different spreading codes are defined for use within the set of predefined formats;

despreading each wireless signal of spread data received in each time frame using a key sequence which is usable to despread the spreading codes defined for all of the physical channels of all formats of the set of predefined formats and storing resultant despread data for each respective time frame in a memory; and determining the number of physical channels and the respective spreading factor for each physical channel for the wireless signal of spread data received in each time frame based upon processing the received signal for each respective time frame.

9. A method of wireless communication according to claim 8 wherein sequential time frames of wireless signals of interleaved spread communication data are received, further comprising:

de-interleaving the stored data despread by the RCRP for each respective time frame into the determined number of physical channels based upon the number of physical channels and respective spreading factor for each physical channel determined for the respective time frame.

10. A method according to claim 8 where the key sequence which usable to despread the spreading codes defined for all of the physical channels of all formats of the set of predefined formats is a minimum spreading code defined for a physical channel of one of the formats of the set of predefined formats which is a subset of the spreading codes defined for all of the physical channels of all other formats of the set of predefined formats, wherein the despreading each wireless signal of spread data RCRP is performed by despreading each wireless signal of spread data received in each time frame using the minimum spreading code.

11. A method according to claim 10 wherein the received signals are frequency division duplex (FDD) uplink communication signals of and there exists at least two format-defined spreading codes of different lengths defined within the set of predefined formats and all format-defined spreading codes of the set of predefined formats consist of one or more repetitions of a minimum spreading code or are the same length as the minimum spreading code.

12. A method according to claim 8 wherein multiple types of Coded Composite Transport Channels (CCTrCHs), each having a predefined Transport Format Combination Set (TFCS) of Transport Format Combinations (TFCs) are despread using a respective selected TFC having a highest data rate, for the type of CCTrCH of respective received frames and the actual TFC used in formatting the data for the respective frame is detected to determine the number of physical channels and the respective spreading factor for each physical channel for the wireless signal of spread data received in each time frame.

13. A method according to claim 12 where a Transport Format Combination Indicator (TFCI) is received within each frame of data reflecting the TFC for that frame of data wherein the format is determined by detecting the TFCI of each frame of data.

14. A method according to claim 12 wherein the actual TFC for each frame is determined using blind code format detection.

15. An application specific integrated circuit (ASIC) for a wireless transmit receive unit (WTRU) that is used in a wireless communication system, the ASIC comprising:

an input configured to receive sequential time frames of wireless signals of spread communication data for selected channels in formats selected from among a set of predefined formats wherein communication data for each time frame is received in a format-defined number of physical channels in which the data for each physical channel has been spread using a respective format-defined spreading code and a respective format-defined spreading factor and where at least two different spreading codes are defined for use within the set of predefined formats;

a memory;

a received chip rate processor (RCRP) configured to despread each wireless signal of the spread data received in each time frame using a key sequence which is usable to despread the spreading codes defined for all of the physical channels of all formats of the set of predefined formats and configured to store resultant despread data for each respective time frame in the memory; and a format detector configured to determine the number of physical channels and the respective spreading factor for each physical channel for the wireless signal of spread data received in each time frame based upon processing the received signal for each respective time frame.

16. An ASIC according to claim 15 wherein the input is configured to receive sequential time frames of wireless signals of interleaved spread communication data further comprising:

a de-interleaver configured to de-interleave the stored data despread by the RCRP for each respective time frame into the determined number of physical channels based upon the number of physical channels and respective spreading factor for each physical channel determined by the format detector for the respective time frame.

17. An ASIC according to claim 15 where the key sequence which usable to despread the spreading codes defined for all of the physical channels of all formats of the set of predefined formats is a minimum spreading code defined for a physical channel of one of the formats of the set of predefined formats which is a subset of the spreading codes defined for all of the physical channels of all other formats of the set of predefined formats, wherein the RCRP is configured to despread each wireless signal of spread data received in each time frame using the minimum spreading code.

18. An ASIC according to claim 17 configured for a Node B that receives frequency division duplex (FDD) uplink communication signals of and there exists at least two format-defined spreading codes of different lengths defined within the set of predefined formats and all format-defined spreading codes of the set of predefined formats consist of one or more repetitions of a minimum spreading code or are the same length as the minimum spreading code.

19. An ASIC according to claim 15 wherein the RCRP is configured to despread multiple types of Coded Composite Transport Channels (CCTrCHs), each having a predefined Transport Format Combination Set (TFCS) of Transport Format Combinations (TFCs) using a respective selected TFC having a highest data rate, for the type of CCTrCH of respective received frames and the format detector is configured to determine the actual TFC used in formatting the data for the respective frame.

20. An ASIC according to claim 19 where a Transport Format Combination Indicator (TFCI) is received within each frame of data reflecting the TFC for that frame of data wherein the format detector detects the TFCI of each frame of data.

* * * * *

UNITED STATES PATENT AND TRADEMARK OFFICE
CERTIFICATE OF CORRECTION

PATENT NO.       : 7,430,234 B2
APPLICATION NO.  : 11/418861
DATED            : September 30, 2008
INVENTOR(S)      : Reznik et al.

It is certified that error appears in the above-identified patent and that said Letters Patent is hereby corrected as shown below:

IN THE SPECIFICATION

At column 1, line 58, before the word "connected" delete "is" and insert therefore --are--.

At column 2, line 7, after the words "over the" delete "Jub" and insert therefore --Iub--.

At column 2, line 28, after the word "serving" delete "networks" and insert therefore --network's--.

At column 5, line 63, before the words "and there" delete "of".

At column 6, line 27, after the word "flow" insert --chart--.

At column 7, line 17, before the word "irrespective" delete "dispreading" and insert therefore --despreading--.

At column 7, line 36, before the words "the signals" delete "a".

At column 7, line 49, after the words "as it" insert --was--.

At column 8, line 50, after the word "has" delete "of".

At column 8, line 60, after the words "generator 15", insert --.--.

At column 9, delete line 56, and insert therefor --(with $SF_{min}=4$)--.

At column 10, line 14, before the words "to FIG. 4" delete "Refering" and insert therefore --Referring--.

At column 10, line 34, before the words "and there" delete "of".

At column 10, line 39, after the word "spreading" delete "cod" and insert therefore --code--.

UNITED STATES PATENT AND TRADEMARK OFFICE
CERTIFICATE OF CORRECTION

PATENT NO. : 7,430,234 B2
APPLICATION NO. : 11/418861
DATED : September 30, 2008
INVENTOR(S) : Reznik et al.

It is certified that error appears in the above-identified patent and that said Letters Patent is hereby corrected as shown below:

IN THE CLAIMS

At claim 1, column 10, line 61, after the word "frame" delete "of".

At claim 3, column 11, line 30, before the word "usable" insert --is--.

At claim 4, column 11, line 41, before the words "and there" delete "of".

At claim 10, column 12, line 27, before the word "usable" insert --is--.

At claim 10, column 12, line 34, after the word "despreading" insert --of--.

At claim 11, column 12, line 40, after the word "signals" delete "of".

At claim 17, column 14, line 2, before the word "usable" insert --is--.

At claim 18, column 14, line 13, after the word "signals" delete "of".

Signed and Sealed this

Fourteenth Day of April, 2009

JOHN DOLL
*Acting Director of the United States Patent and Trademark Office*